(12) United States Patent
Okuyama et al.

(10) Patent No.: US 7,869,522 B2
(45) Date of Patent: Jan. 11, 2011

(54) VIDEO SIGNAL MULTIPLEXER, VIDEO SIGNAL MULTIPLEXING METHOD, AND PICTURE REPRODUCER

(75) Inventors: Tomoyuki Okuyama, Kanagawa (JP); Kenji Tanaka, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 1439 days.

(21) Appl. No.: 11/274,185

(22) Filed: Nov. 16, 2005

(65) Prior Publication Data

US 2006/0104368 A1    May 18, 2006

(30) Foreign Application Priority Data

Nov. 17, 2004   (JP) ............................... 2004-332653

(51) Int. Cl.
H04N 11/02   (2006.01)
(52) U.S. Cl. ............................... 375/240.28; 348/423.1; 348/425.4; 348/434.1; 348/476
(58) Field of Classification Search ............ 375/240.28, 375/354; 348/464, 423.1, 425.4, 434.1, 476, 348/500, 516
See application file for complete search history.

(56) References Cited

U.S. PATENT DOCUMENTS

| 4,122,477 | A | * | 10/1978 | Gallo | 348/497 |
| 4,250,521 | A | * | 2/1981 | Wright | 348/616 |
| 4,463,380 | A | * | 7/1984 | Hooks, Jr. | 348/580 |
| 4,849,817 | A | * | 7/1989 | Short | 375/240.01 |
| 5,479,299 | A | * | 12/1995 | Matsumi et al. | 386/54 |
| 6,357,042 | B2 | * | 3/2002 | Srinivasan et al. | 725/32 |
| 6,573,905 | B1 | * | 6/2003 | MacInnis et al. | 345/629 |
| 2004/0202455 | A1 | | 10/2004 | Yanagihara et al. | |
| 2005/0094966 | A1 | * | 5/2005 | Elberbaum | 386/46 |
| 2006/0044468 | A1 | * | 3/2006 | Chowdhury et al. | 348/465 |
| 2007/0064095 | A1 | * | 3/2007 | Baartman et al. | 348/14.08 |

FOREIGN PATENT DOCUMENTS

| JP | 2001-24983 | 1/2001 |
| JP | 2001-223994 | 8/2001 |
| JP | 2003-230112 | 8/2003 |

OTHER PUBLICATIONS

English Translation of Japanese Patent Publication JP2003-230112.*
Japanese Office Action dated Jul. 7, 2009, with partial English translation.
Chinese office action dated Aug. 8, 2008 with English translation.

* cited by examiner

Primary Examiner—Jon Chang
(74) Attorney, Agent, or Firm—McGinn Intellectual Property Law Group, PLLC

(57) ABSTRACT

An embodiment of the present invention provides a video signal multiplexing apparatus including a separator separating picture information and additional information from a received video signal, a controller adjusting, if the picture information is out of sync with the additional information, a data amount of the additional information based on a data amount of the picture information in such a manner that the picture information is in sync with the additional information, and a multiplexer multiplexing the encoded data and the additional information the data amount of which has been adjusted.

17 Claims, 8 Drawing Sheets

VIDEO SIGNAL MULTIPLEXER, VIDEO SIGNAL MULTIPLEXING METHOD, AND PICTURE REPRODUCER

BACKGROUND OF THE INVENTION

1. Field of the Invention

The present invention relates to a video signal multiplexer, a video signal multiplexing method, and a picture reproducer, and more particularly to a video signal multiplexer, a video signal multiplexing method, and a picture reproducer, each of which encodes picture information in a video signal to multiplex the encoded information with additional information.

2. Description of Related Art

In recent years, a technique of converting a moving image into a digital signal to record and transfer such digital data has attracted attention. In response thereto, techniques of encoding moving images such as MPEG (moving pictures expert group) are of increasing importance. Encoding the moving image is targeted at not only picture information displayed on a screen but audio information such as a voice, sound effect, and music. Further, there have been proposed a variety of multiplexing techniques for encoding additional information such as captions (subtitles) besides the picture information, and extracting the captions from the additional information to display the captions as well as the picture information at the time of reproducing the moving images (see Japanese Unexamined Patent Publication No. 2001-24983, for example).

The conventional technique of multiplexing picture information with additional information is described in brief. FIG. 9 shows a structural example of a video signal multiplexer of the related art. A video signal multiplexing apparatus 200 of FIG. 9 includes a separator 201 such as Vertical Blanking Interval DATA Slicer, an encoder 202, an encoded data storage 203, an additional information storage 204, and a multiplexer 205.

The separator 201 receives the video signal, and separates the received video signal into picture information and additional information. In this example, the picture information refers to information about video pictures displayed on the screen in the received video signals. Further, the additional information implies other information than the picture information, but the additional information includes information such as captions and thus may be displayed on the screen after being multiplexed. The picture information and the additional information are input on a field basis. The field is a unit constituting a part of a frame.

The separator 201 separates the video signal to send the picture information to the encoder 202 and the additional information to the additional information storage 204. The encoder 202 encodes the picture information supplied from the separator 201. The data encoded with the encoder 202 is sent to the encoded data storage 203 and stored therein. The encoded data is generated for each field or frame, and recorded.

The multiplexer 205 receives the encoded data stored in the encoded data storage 203 and the additional information stored in the additional information storage 204 to multiplex these on the basis of unit group called a GOP (group of pictures). FIG. 10 shows a data flow in a multiplexing process of the related art. Additional information 10 of FIG. 10 is one stored in the additional information storage 204. Picture information frame data 20 is encoded data stored in the encoded data storage 203. The picture information frame data 20 is supplied to the multiplexer 205 on the frame basis. The multiplexer 205 receives the encoded data from the encoded data storage 203 in such amounts as correspond to the number of frames constituting the GOP. Further, the multiplexer 205 also receives the additional information 10 from the additional information storage 204 in such amounts as correspond to the number of frames constituting the GOP. The received additional information are all contained in a user data area 311 in a GOP layer 31 corresponding to a header portion of the GOP.

The multiplexer 205 creates the GOP layer 31 using the additional information supplied from the additional information storage 204 to generate GOP data 30 as stream data of each GOP with the encoded data supplied from the encoded data storage 203. Thus, the multiplexing is completed. Upon the reproduction, the encoded data is decoded into picture information to reproduce the decoded picture information, and the additional information is retrieved from the user data area 311 of the GOP layer 31 to display the resultant as caption data.

The video signal is multiplexed this way. It has now been discovered that, however, this method causes no problem as long as multiplexed data is generated in sync with the input video signal. Otherwise, a problem arises. For example, when data is encoded while converting video pictures of 24 frames/sec. such as a movie into video pictures of 30 frames/sec. such as a TV image, or when such data is decoded, synchronous signals have different time axes, so the picture rolls up or down. To prevent this, it is necessary to match phases of the synchronous signals. At this time, if the processing of separating the additional information and the picture information to match phases for the picture information is carried out as in the related art, the change in the number of frames is not reflected on the additional information, so a delay occurs during the multiplexing. Further, in the case of correcting analog signals between frames, which are liable to become unstable due to the jitter of images on a screen resulting from terrestrial waves as analog waves or unsmooth tape transport and fluctuation of the time axis, the case where the repeatedly dubbed tape is used as an input source, or other such cases, the additional information cannot be recorded normally.

Further, the synchronization can be achieved by correcting the time axis by use of a time-based corrector etc. prior to the separation. However, in this case, the corrected video signal that includes the additional information undergoes the skip or repeat processing without examining the additional information. Hence, the additional information is also partially lost due to the skip processing or is duplicated due to the repeat processing. If such additional information is multiplexed as it is, data consistency cannot be attained.

In encoding data in conformity with the MPEG standard or the like, it is necessary to consider a capacity of the user data area with a varying number of video-picture frames constituting the GOP. Howbeit, the picture information and the additional information are separately processed and thus, cannot be synchronized. Accordingly, the conventional method encounters another problem that the multiplexing is impossible with a varying number of video-picture frames constituting the GOP.

As mentioned above, the conventional technique has the problems in that the picture information is hardly synchronous with the additional information at the time of multiplexing the video signal, and in that the multiplexing is impossible with a varying number of frames constituting the GOP.

SUMMARY OF THE INVENTION

An aspect of the present invention provides a video signal multiplexing apparatus for receiving a video signal containing picture information and additional information, encoding the picture information in the video signal and then multiplexing the encoded picture information with the additional information. The video signal multiplexing apparatus comprises a separator receiving the video signal to separate the picture information and the additional information contained in the video signal, an additional information storage storing the separated additional information, an encoder encoding the separated picture information, a controller adjusting, if the picture information is out of sync with the additional information, a data amount of the additional information stored in the additional information storage based on a data amount of the picture information in such a manner that the picture information is in sync with the additional information; and, a multiplexer multiplexing the encoded data generated with the encoder and the adjusted additional information. With such a structure, even if the picture information is partially skipped or repeated, the controller makes adjustment to synchronize the picture information and additional information, whereby the synchronization can be attained between the picture information and the additional information.

Another aspect of the present invention provides a video signal multiplexing apparatus for receiving a video signal containing picture information and additional information, encoding the picture information in the video signal and then multiplexing the encoded picture information with the additional information. The video signal multiplexing apparatus comprises a separator receiving the video signal to separate the picture information and the additional information from the video signal, a time based corrector receiving the separated picture information to correct a time axis of the picture information, an encoder encoding the picture information the time axis of which has been corrected with the time based corrector, an encoded data storage storing encoded data from the encoder, an additional information storage storing the separated additional information, a multiplexer multiplexing the encoded data stored in the encoded data storage and the additional information stored in the additional information storage. With such a structure, the additional information is first separated and extracted, so even if the time axis correction is performed, there is no fear that the additional information cannot be extracted.

An another aspect of the invention provides a video signal multiplexing method for receiving a video signal containing picture information and additional information, encoding the picture information in the video signal and then multiplexing the encoded picture information with the additional information. The video signal multiplexing method comprises receiving the video signal, separating the picture information and the additional information from the video signal, encoding the separated picture information, adjusting, if the picture information is out of sync with the additional information, a data amount of the additional information based on a data amount of the picture information in such a manner that the picture information is in sync with the additional information, and multiplexing the encoded data generated through the encoding and the additional information the data amount of which is adjusted. According to this method, even if the picture information is partially skipped or repeated, the controller makes adjustment to synchronize the picture information and additional information, whereby the synchronization can be attained between the picture information and the additional information.

Another aspect of the invention provides a video signal multiplexing method for receiving a video signal containing picture information and additional information, encoding the picture information in the video signal and then multiplexing the encoded picture information with the additional information. The video signal multiplexing method comprises receiving the video signal to separate the picture information and the additional information from the video signal, receiving the separated picture information, correcting a time axis of the picture information, encoding the picture information the time axis of which has been corrected, and multiplexing the generated encoded data and the separated additional information. According to this method, the additional information is first separated and extracted, so even if the time axis correction is performed, there is no fear that the additional information cannot be extracted.

According to the present invention, it is possible to provide a video signal multiplexer and video signal multiplexing method capable of synchronizing picture information and additional information video even if a frame of the information is skipped or repeated.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

The video signal multiplexing in accordance the present invention is explained hereinafter. The video signal multiplexing apparatus in accordance with one aspect of the present invention receives a video signal containing picture information and additional information, encodes the picture information in the video signal and then multiplexing the encoded picture information with the additional information.

In the video signal multiplexing apparatus, the separator receives the video signal to separate the picture information and the additional information contained in the video signal. The separated additional information is stored in the additional information storage. The separated picture information is encoded by the encoder.

The controller adjusts, if the picture information is out of sync with the additional information, a data amount of the additional information stored in the additional information storage based on a data amount of the picture information in such a manner that the picture information is in sync with the additional information. The multiplexer multiplexes the encoded data generated with the encoder and the adjusted additional information.

The video signal multiplexing apparatus in accordance with another aspect of the present invention receives a video signal containing picture information and additional information, encodes the picture information in the video signal and then multiplexes the encoded picture information with the additional information.

In the video signal multiplexing apparatus, the separator of the apparatus receives the video signal to separate the picture information and the additional information from the video signal. The time based corrector receives the separated picture information to correct a time axis of the picture information.

The encoder encodes the picture information the time axis of which has been corrected with the time based corrector. The encoded data from the encoder is stored in the encoded data storage. The separated additional information is stored in the additional information storage. The multiplexer multiplexes the encoded data stored in the encoded data storage and the additional information stored in the additional information storage.

Figure 1:
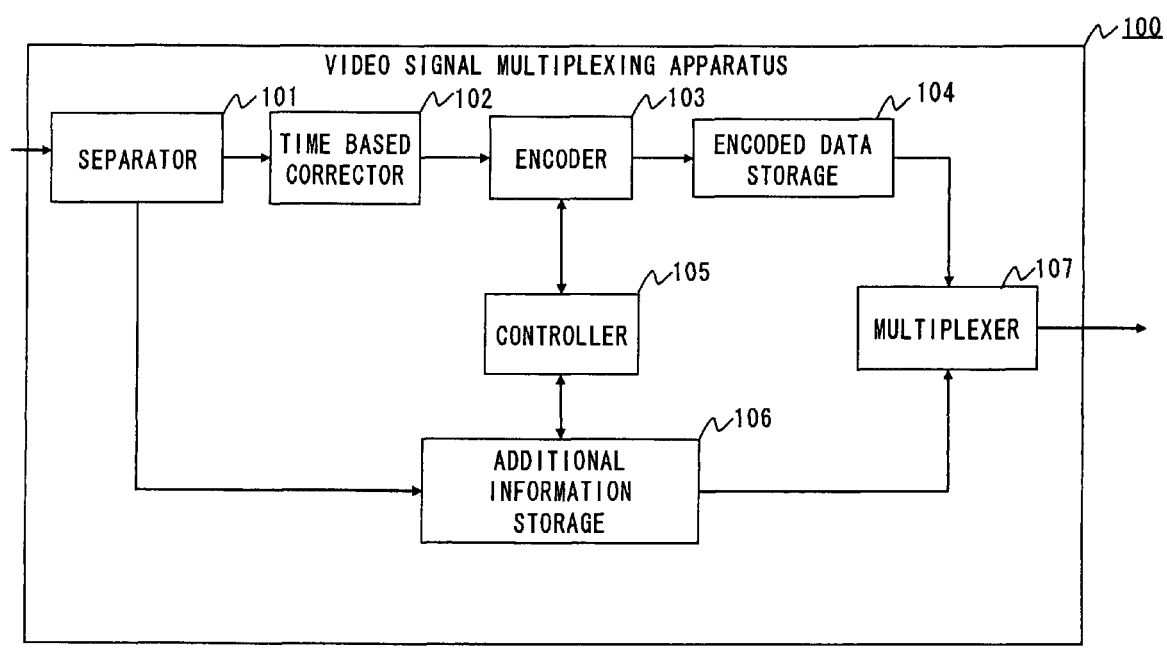
FIG. 1 is a block diagram showing the configuration of a video signal multiplexer according to the present invention.

FIG. 1 is a block diagram showing the configuration of a specific video signal multiplexer according to an embodiment of the present invention. A video signal multiplexing apparatus 100 includes a separator 101, a time based corrector 102, an encoder 103, an encoded data storage 104, a controller 105, an additional information storage 106, and a multiplexer 107.

The separator 101 is a slicer receiving a video signal to separate the received video signal into picture information and additional information. The separator 101 is typically a Vertical Blanking Interval (VBI) DATA Slicer. For a video signal based on an NTSC system widely used in Japan or USA, 525 scanning lines composing video pictures of one frame are divided into two fields based on an interlacing system, and scanning is effected every 262.5 scanning lines. The 22nd to 262nd lines out of 262.5 scanning lines are used for actual transmission of video pictures. In this example, information on such lines corresponds to picture information. A scanning period for preceding lines, i.e., the first to 21st scanning lines is a vertical blanking period. Among those, the 21st scanning line may record information such as captions (subtitles) to be transmitted. In this example, this information corresponds to additional information. The additional information of this example is referred to as line 21 data since this information is recorded on the 21st scanning line. The separator 101 sends the separated picture information to the time based corrector 102, and sends the additional information to the additional information storage 106.

Figure 7:
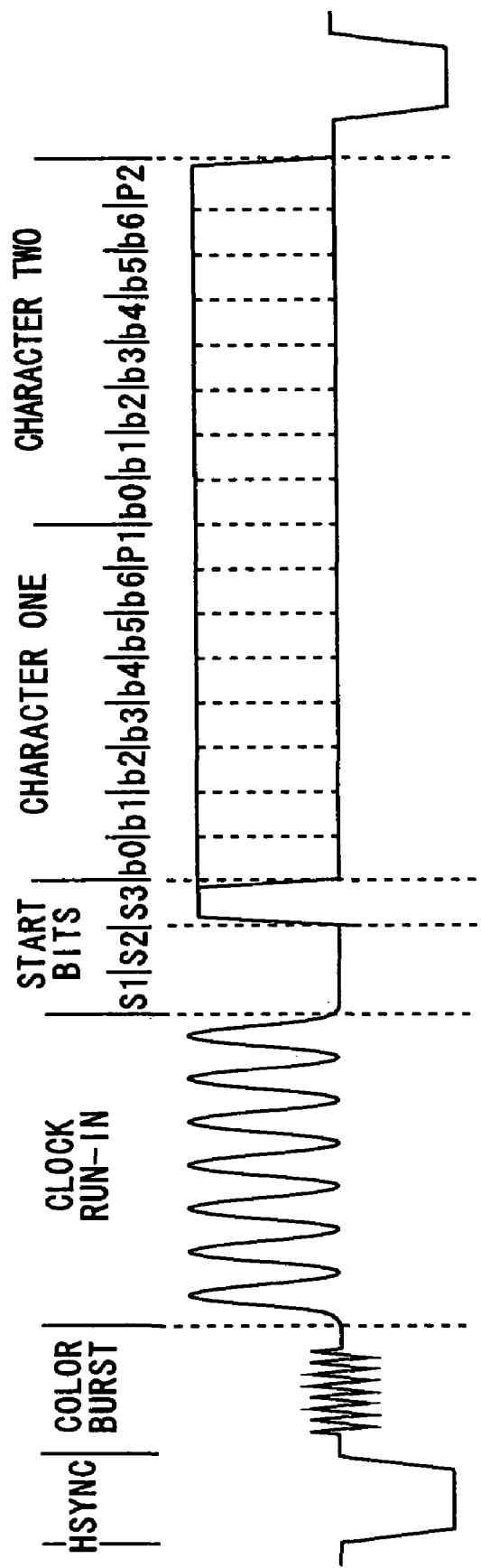
FIG. 7 shows the signal waveform of the 21st scanning line according to the present invention.

FIG. 7 shows a signal waveform of the 21st scanning line. This signal waveform is composed of a horizontal synchronous signal (Hsync), burst signal (Color Burst), clock run-in (Clock Run-In), start bits (Start Bits), character one data (Character One), and character two data (Character Two), and two types of character data, character one and character two, can be stored. Each character data has 8 bits composed of 7 bits and 1 bit as parity bit. The 8-bit data is used as the line 21 data such as character information. Herein, the character information is taken as an example, but multiplexed data is not limited to the character information, and any data represented by a predetermined number of bits can be multiplexed.

The time based corrector 102 corrects the time axis of the picture information sent from the separator 101. As the time based corrector 102, the existing time-based corrector or frame synchronizer can be used. The picture information having undergone the time axis correction is sent to the encoder 103. The time axis correction with the time based corrector 102 may come before the separation with the separator 101. However, if the time axis correction is carried out first, the line 21 data, which is basically sampled in sync with the clock run-in, is out of sync with the input of signal data due to the time axis correction, and thus is sampled at wrong positions. This makes it impossible to extract the data represented by data bits. As a result, the additional information is destructed, and there is a possibility that the separator 101 fails in correctly separating the additional information. To overcome such a problem, according to the present invention, the time based corrector 102 effects the time axis correction on the picture information separated with the separator 101.

The encoder 103 encodes the picture information the time axis of which has been corrected by the time based corrector 102. An encoding method of this example is basically similar to the conventional one. The encoder 103 encodes the picture information to output the thus-generated encoded data to the encoded data storage 104. The encoder 103 outputs information regarding the encoded data such as the number of frames, to the controller 105.

The encoded data storage 104 is a stream buffer receiving and storing the encoded data generated with the encoder 103. As the encoded data storage 104, a readable/writable storage medium such as a memory or hard disk is used. The encoded data stored in the encoded data storage 104 is output to the multiplexer 107 and is then multiplexed by the multiplexer 107.

The controller 105 adjusts the additional information stored in the additional information storage 106 based on the information regarding the encoded data supplied from the encoder 103. The adjustment over the additional information aims at synchronizing the encoded data and the additional information at the time of multiplexing them with the multiplexer 107. A specific method therefor is detailed later.

The additional information storage 106 receives and stores the additional information separated with the separator 101. As the additional information storage 106, a writable/readable storage medium such as a memory or hard disk is used. The additional information storage 106 may store the additional information in a storage medium shared with the encoded data storage 104. The additional information storage 106 stores the received additional information in the order of inputting, and the stored information are read out by the multiplexer 107 in the order of inputting. This is accordingly called a FIFO (first in first out) as well. The controller 105 inserts (adds) or deletes data in/from the additional information storage 106.

The multiplexer 107 multiplexes the encoded data supplied from the encoded data storage 104 with the additional information supplied from the additional information storage 106. Herein, the multiplexing processing is carried out for each GOP. The multiplexer 107 checks the number of frames of encoded data stored in the encoded data storage 104, and starts the multiplexing when the encoded data equivalent to 1 GOP is stored. At this time, the multiplexer 107 sends the encoded data equivalent to 1 GOP on a packet basis. The multiplexer inserts the additional information corresponding to 1 GOP, which is supplied from the additional information storage 106, into the user data area in a packet, thereby multiplexing the encoded data with the additional information.

Figure 2:
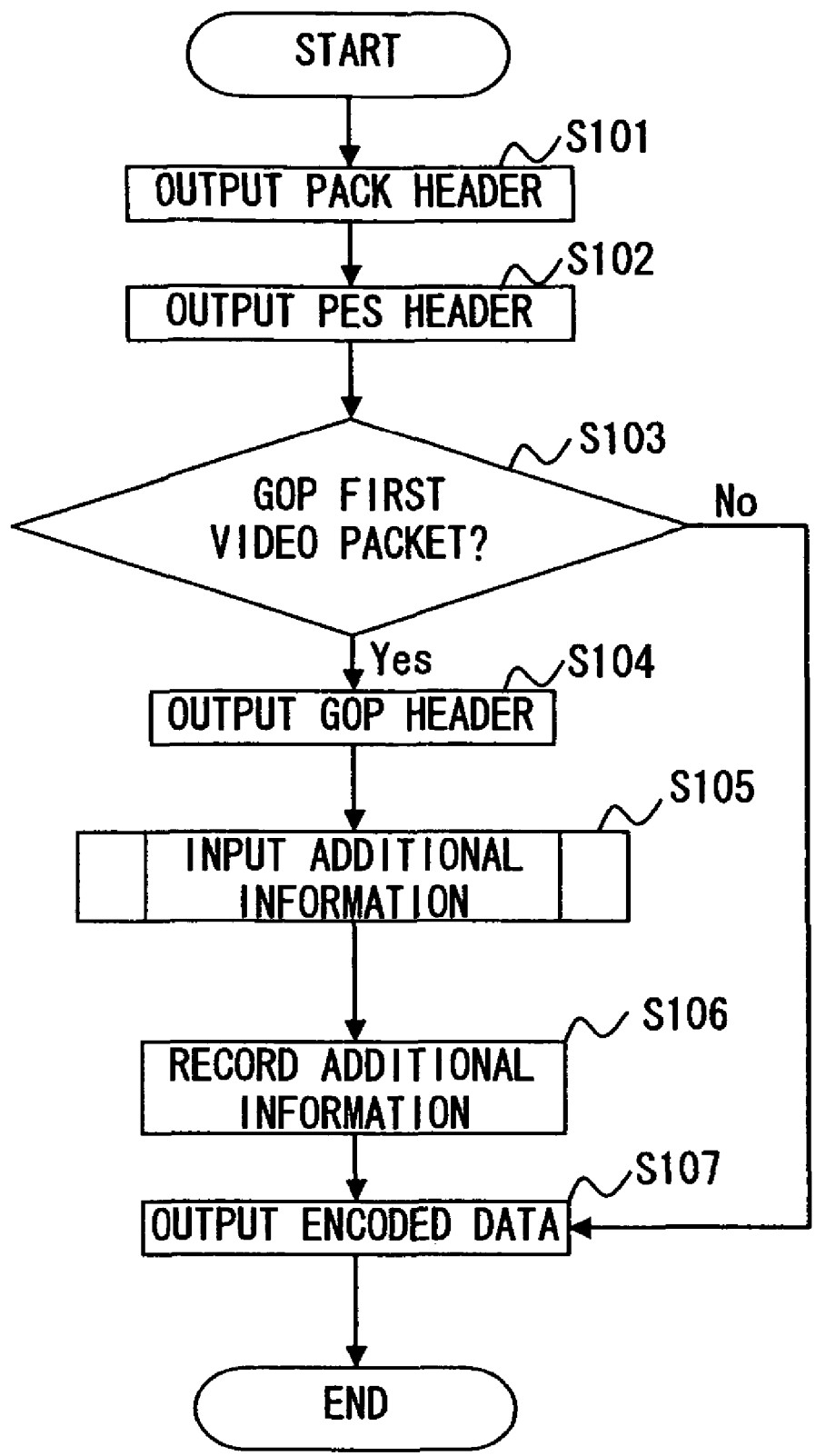
FIG. 2 is a flowchart illustrative of a processing flow in a multiplexer according to the present invention.

Referring to a flowchart of FIG. 2, the multiplexing processing of the multiplexer 107 is explained in detail.

Figure 8:
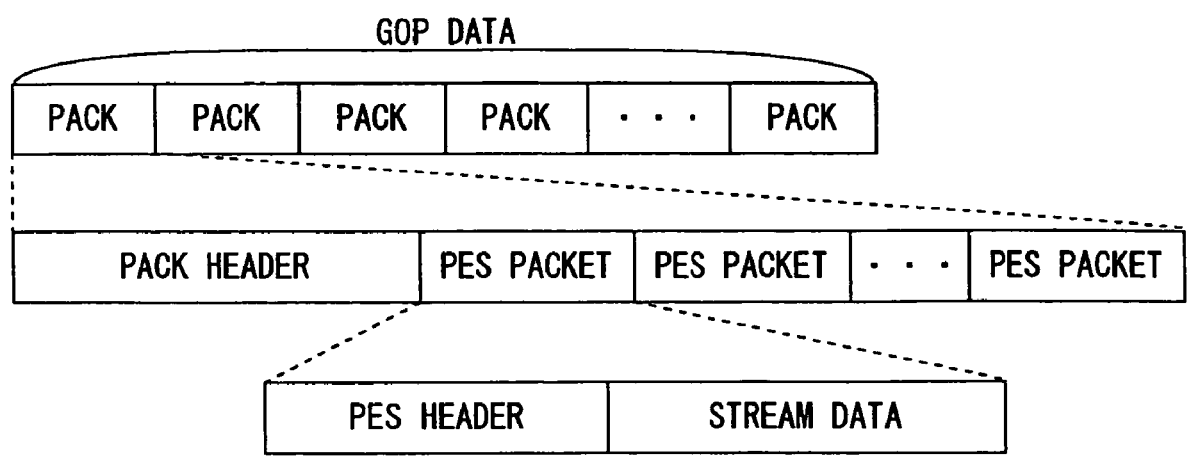
FIG. 8 shows the structure of multiplexed data according to the present invention.
Figure 9:
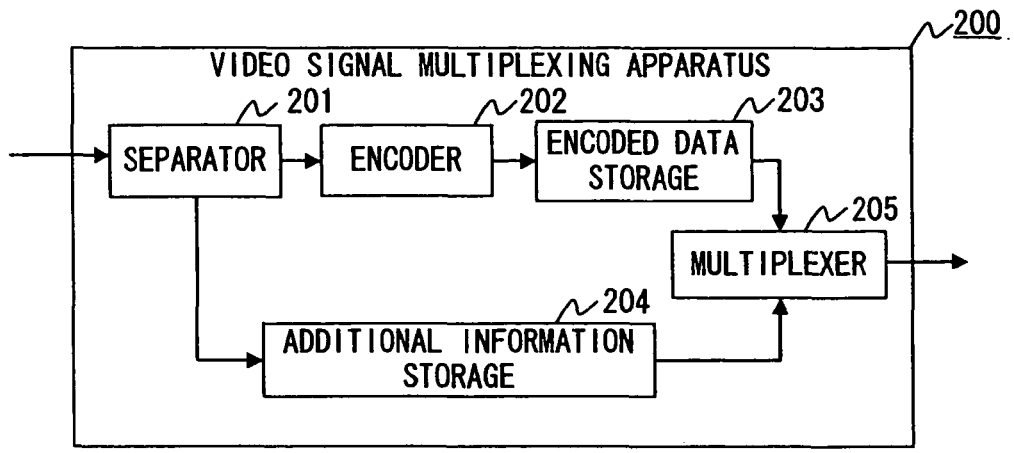
FIG. 9 shows the configuration of a video signal multiplexer of the related art.
Figure 10:
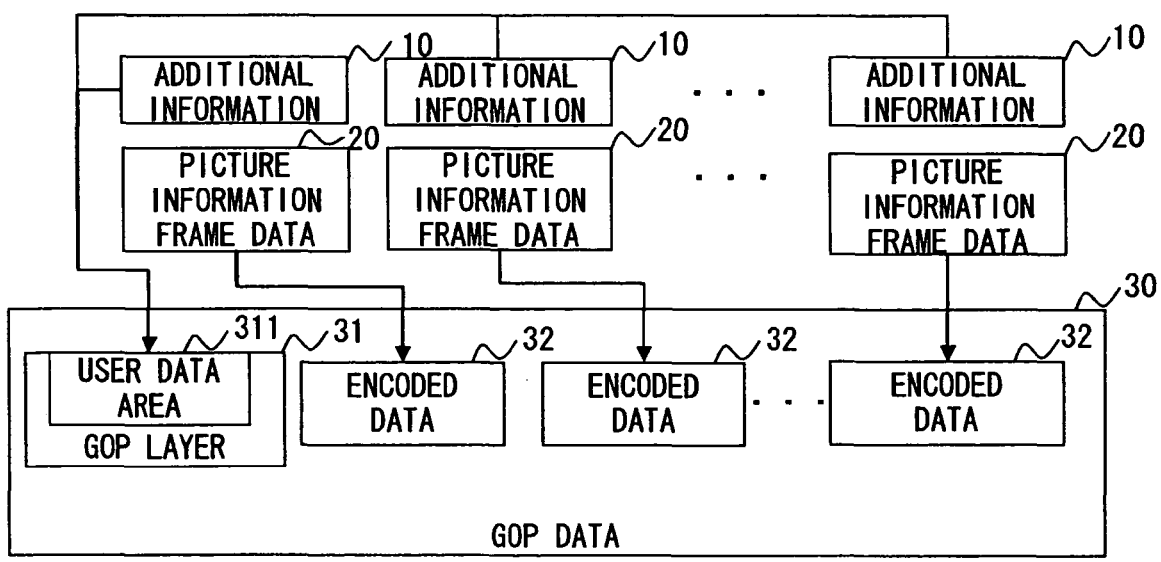
FIG. 10 shows a data flow during a multiplexing processing of the related art.

Referring to FIG. 8, the structure of data used for the processing of the multiplexer 107 is described first. To begin with, the multiplexing processing is carried out on the GOP basis. The GOP is divided into packs. At this time, the divided packs include the GOP header information and encoded data. A first video packet as a first pack stores data in the GOP header, and a second and subsequent packs store the encoded data. Each pack is composed of one packet header and a set of plural packet data called PES (packetized elementary system) packet data. A feature of the PES packet data resides in the variable data length. The PES packet includes a PES header and stream data. The PES header contains the data length of the PES packet data, a code identifying stream data, and other control information. An area of the stream data stores the data of the GOP header and the encoded data. FIG. 8 shows the data structure.

Referring now to a flowchart of FIG. 1 and FIG. 2, First of all, the multiplexer 107 outputs the pack header (S101). The pack header contains the overall information about packs or the like. Next, the multiplexer 107 sends out the PES header of a first PES packet (S102).

Subsequently, if the pack data as the first video packet of the GOP is generated (S103), the multiplexer 107 needs to store the GOP header in the generated pack data, and thus outputs the data up to the GOP header (S104). The GOP header has a user data area to store the additional information. Thus, the multiplexer 107 receives the additional information from the additional information storage 106 in amounts to be stored in the GOP (S105), and records the received additional information in the user data area (S106).

The encoder 103 needs to encode data taking into account a transition of a buffer used for the encoding with the encoder 103, and to consider the size of the user data area of the GOP header. This buffer refers to a VBV (video buffering verifier) buffer upon the MPEG encoding. The number of frames constituting the GOP during the encoding processing should be set in consideration of this user data area. The number of frames constituting the GOP may vary depending on the GOP, and the capacity of the user data area is set to a value corresponding to the maximum possible number of frames constituting the GOP, so as to store all additional information. If the number of frames constituting the GOP is not maximum, stuffing data are inserted into the remaining areas in order to adjust the data length. With such settings, it is possible to deal with a varying number of frames constituting the GOP. For example, if reverse 3-2 pull down processing for converting video pictures recoded at the frame rate of 24 frames/sec. into video pictures at the frame rate of 30 frames/sec. is carried out in the encoding processing with an MPEG encoder, the number of frames in the GOP changes; such a situation can be dealt with.

After the GOP header was created, picture information composing the GOP is stored. The data other than the GOP header, which compose the GOP, are encoded data supplied from the encoded data storage 104, so data other than the GOP first header in the GOP first video packet and GOP data other than the GOP first video packet carry the encoded data supplied from the encoded data storage 104 in accordance with the data length of the PES (S107). The data length of the PES is known based on the data stored in the PES header.

The encoded data and the additional information are multiplexed together for each GOP this way, and the multiplexed data is output every pack data composing the GOP data. This applies to all the GOPs.

Figure 3:
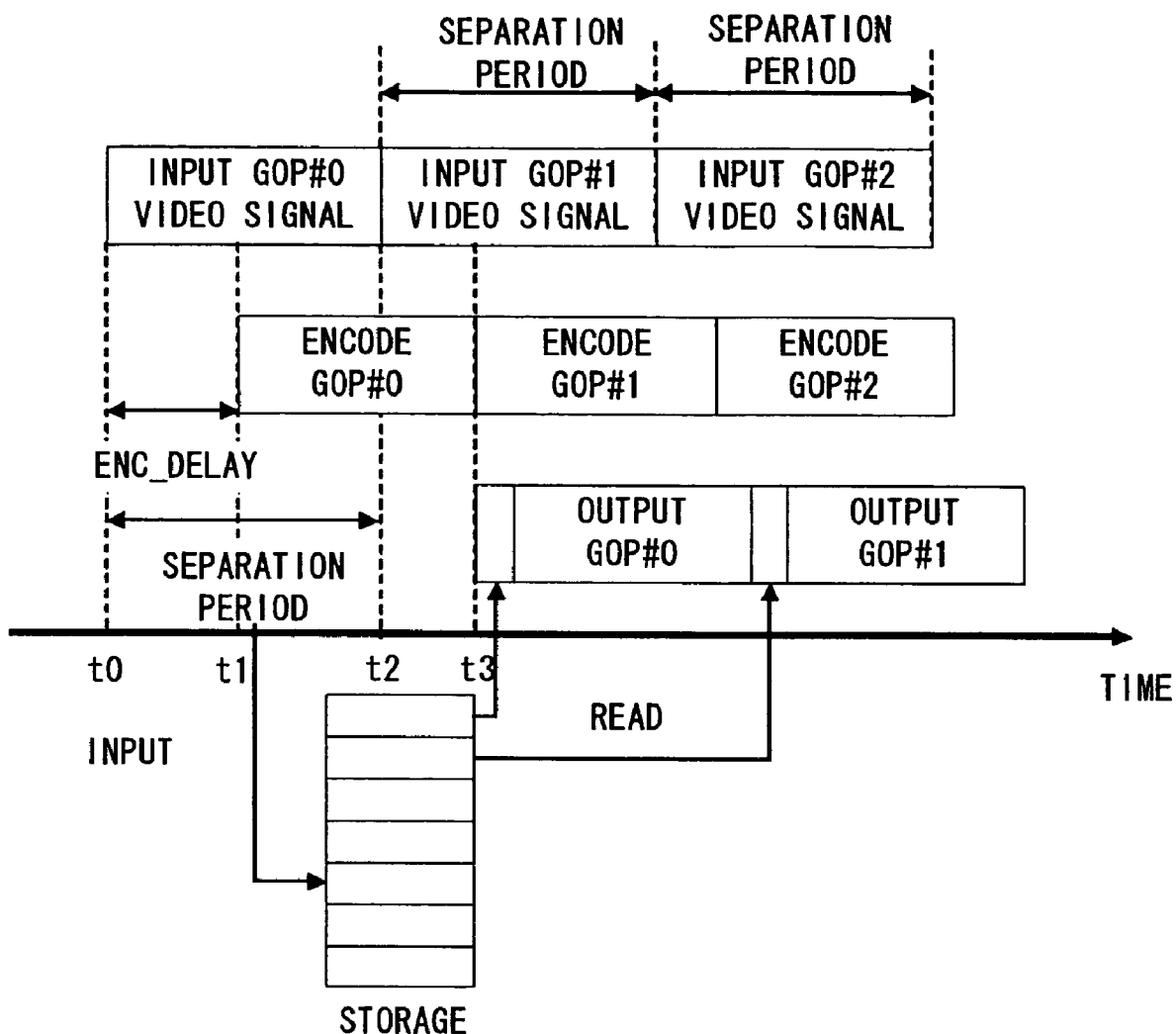
FIG. 3 is a timing diagram showing a flow of a multiplexing processing according to the present invention.

Next, a processing flow of the video signal multiplexer according to the embodiment of the present invention is described. FIG. 3 is a timing diagram showing a flow of the multiplexing processing according to the embodiment of the present invention. First of all, the separator 101 receives the video signal. This time point is defined as t0. The video signal is entered in order from the top frame. The separator 101 separates the received video signal into picture information and the additional information. The separation is carried out for each frame in the order in which the frame is received. Upon the completion of the separation, the separator 101 sends the separated picture information to the time based corrector 102 and sends the additional information to the additional information storage 106.

The timing diagram of FIG. 3 shows the received video signal or encoded data on the GOP basis. A GOP#0 includes a video signal/encoded data corresponding to frames constituting the first GOP. The separator 101 performs separation in the order in which the frame is received. Hence, as shown in FIG. 3, the input and separation of the video signal in each GOP are executed during the same period. In short, the video signal input period is equal to the separation period, and is represented as (t2−t0).

The time based corrector 102 executes the time axis correction on the picture information supplied from the separator 101 in accordance with the change in the number of frames in the picture information. That is, in the case of increasing the number of frames, the repeat processing for redisplaying the video pictures of a previous frame is carried out. On the contrary, in the case of decreasing the number of frames, the skip processing for skipping out the video pictures of a given frame is carried out. After completing the time axis correction of the picture information, the time based corrector 102 sends the resultant picture information to the encoder 103. This processing is effected within a period from the input of the video signal to the encoding processing.

Next, the encoder 103 encodes the received picture information. In encoding data based on the MPEG system etc., the encoding processing is not always performed on frames in the order of inputting. Besides, the interframe differential information should be extracted during the encoding processing, so the data cannot be encoded immediately after being input. As a result, a delay occurs between the input of the video signal and the start of the encoding processing. Herein, this delay time is represented on the basis of received frame, as "enc_delay". The encoding processing is started as soon as an encoder is ready for encoding. This time point is "t1". Upon the completion of encoding of GOP#0, the encoder 103 supplies the encoded data to the encoded data storage 104. This time point is "t3".

In general, the enc_delay varies depending on the GOP structure. For example, assuming that an M value representing a core picture period is 3, the encoding is started with the picture information of the third frame. Thus, the encoding processing should wait until previous two frames are input, and the "enc_delay" equals 2.

Upon the completion of encoding, the multiplexer 107 multiplexes the encoded data sent from the encoded data storage 104 with the additional information sent from the additional information storage 106. A specific method therefor is as above.

Next, description is given of how to synchronize the picture information and the additional information. While the time axis of the picture information is corrected by the time based corrector 102, the additional information has not undergone the time axis correction. Hence, if being multiplexed as it is, the additional information cannot be synchronized with the picture information. Thus, the controller 105 adjusts the additional information stored in the additional information storage 106 to synchronize the picture information and the additional information. This processing is described in detail.

Figure 4:
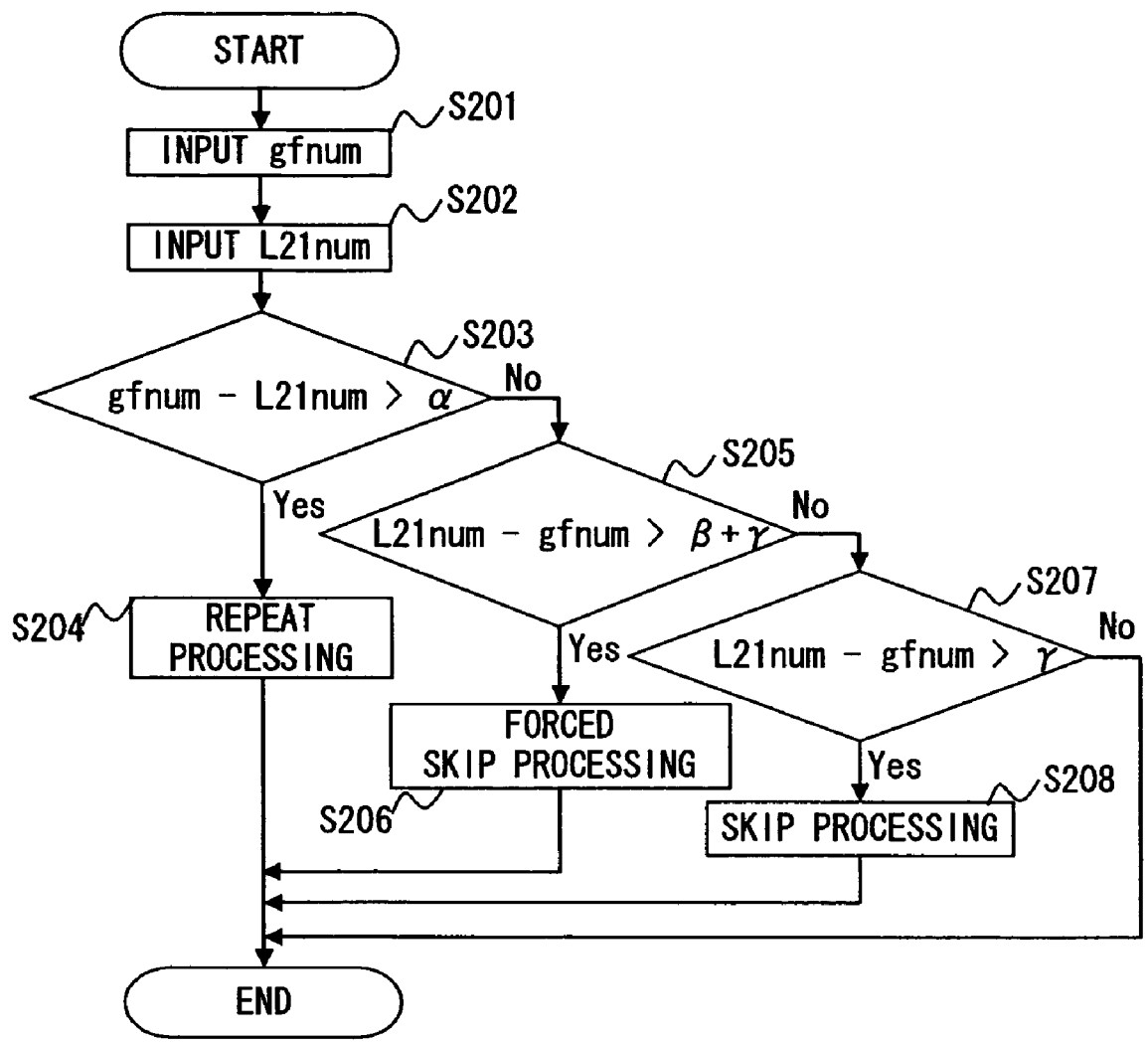
FIG. 4 is a flowchart illustrative of a processing flow in a controller according to the present invention.

FIG. 4 is a flowchart showing a processing flow of the controller 105 according to the present embodiment. For illustrative purposes, the number of video frames constituting the GOP is defined as gfnum, and the data amount of additional information stored in the additional information storage 106 is defined as L21num. The data amount of the additional information is determined based on the number of frames of the received video signal. For example, the video signal of 15 frames yields the additional information of 15 frames.

First of all, the controller 105 receives the value of gfnum from the encoder 103 (S201). Next, the controller 105 receives the value of L21num as the data amount of the additional information stored in the additional information storage 106 (S202).

After having received the values of gfnum and L21num, the controller 105 compares the value of gfnum with the value of L21num to perform processing in accordance with the comparison result.

Figure 5:
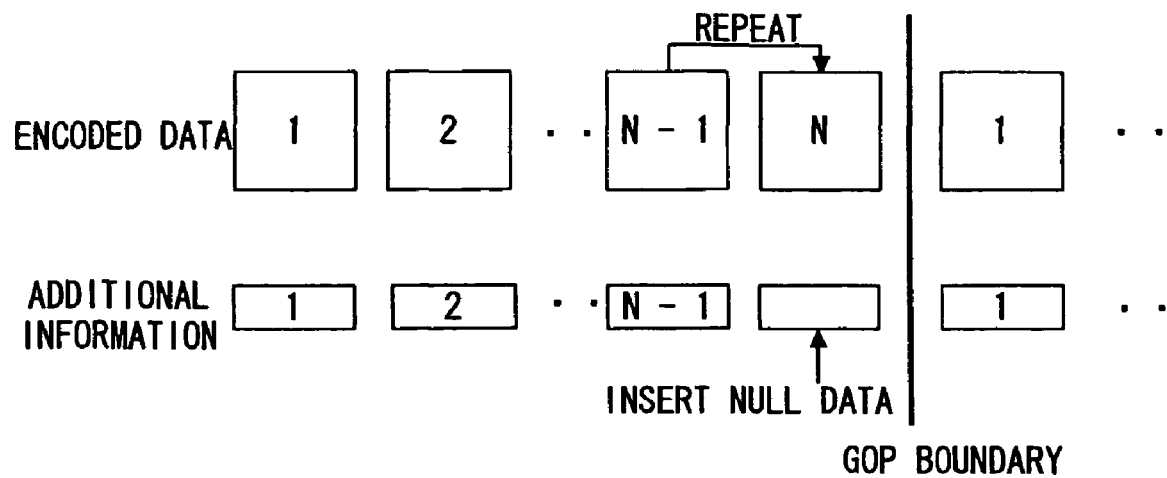
FIG. 5 shows how encoded data is synchronized with additional information according to the present invention.

First, if the expression of gfnum−L21num>$\alpha$ is established (S203), the repeat processing is carried out (S204). In the expression, $\alpha$ represents a constant. This suggests that, as a result of the time axis correction with the time based corrector 102, the original frame rate of the received video signal is corrected to be faster. In other words, the number of frames per unit time is increased. Here, in order to increase the number of frames, the repeat processing for repeatedly displaying the video pictures of a previous frame is carried out. In this case, the repeat processing should be performed on the additional information as well. The repeat processing is carried out by repeatedly inserting null data to the end of the additional information storage 106 until (gfnum−L21num) equals $\alpha$. FIG. 5 shows the configurations of the encoded data storage 104 and the additional information storage 106 for the repeat processing. In the illustrated example, gfnum is N, L21num is (N−1), and $\alpha$ is 1. The picture information is subjected to the repeat processing at the Nth frame, so a piece of null data is inserted to the last frame of the additional information storage portion.

Next, the expression of L21num−gfnum>$\beta$+$\gamma$ is established (S205), a forced skip processing is effected (S206) In this expression, $\beta$ represents a constant. This suggests that as a result of the time axis correction with the time based corrector 102, the original frame rate of the received video signal is corrected to a much smaller (slower) one. In other words, the number of frames per unit time decreases. It is appreciated, in order to decrease the number of frames, a skip processing for deleting a frame is repeated many times. At this time, the skip processing should be executed for the additional information as well. The skip processing is carried out by deleting a part of data from the additional information stored in the additional information storage 106 until (L21−gfnum) equals $\gamma$. The null data is first deleted if any. When (L21−gfnum) cannot equal $\gamma$ even if all the null data are deleted, other data than null data may be deleted from the additional information. The reason therefor is as follows: in such a situation, it is highly likely that the input video signal is a non-standard signal due to noise etc., and if so, the effectiveness of the additional information is low.

Figure 6:
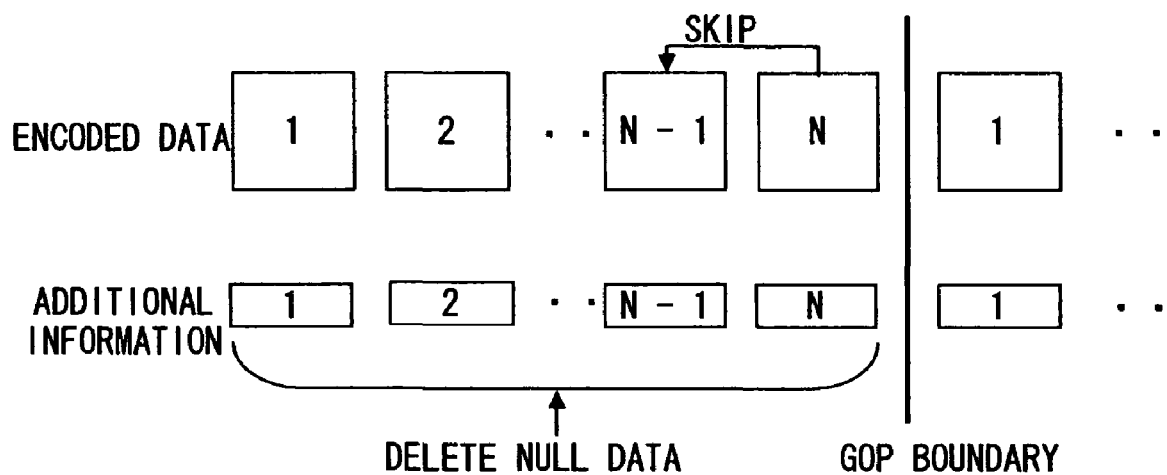
FIG. 6 shows how encoded data is synchronized with additional information according to the present invention.

Finally, the expression of L21num−gfnum>$\gamma$ is established (S207), the skip processing is executed (S208). In this case, as a result of the time axis correction with the time based corrector 102, the original frame rate of the received video signal is supposedly corrected to a smaller (slower) one. In other words, the number of frames per unit time is decreased. For that purpose, the skip processing for deleting the frames would be performed. At this time, the skip processing should be performed on the additional information as well. The skip processing is carried out by deleting only null data in the additional information stored in the additional information storage 106. FIG. 6 shows the configurations of the encoded data storage 104 and the additional information storage 106 for the repeat processing. If the additional information of N frames includes null data, the null data is deleted. Otherwise, the excessive additional information is assumed to be additional information for the next GOP and thus is not subjected to skip processing.

The values of $\alpha$, $\beta$, and $\gamma$ are preferably set to 2 under the provision of the NTSC television system, but such values are determined by experiment, and the values of $\alpha$, $\beta$, and $\gamma$ are not limited thereto.

As set forth above, the additional information also undergoes the repeat processing and the skip processing corresponding to the repeat processing and the skip processing for the picture information, whereby the picture information and the additional information can be synchronized.

It is apparent that the present invention is not limited to the above embodiment and it may be modified and changed without departing from the scope and spirit of the invention. For example, in the above embodiment, the separator, the controller, and the multiplexer are all provided, but only the separator and the multiplexer, or the controller and the multiplexer can exert similar functions.

What is claimed is:

1. A video signal multiplexing apparatus for receiving a video signal containing picture information and additional information, encoding the picture information in the video signal and then multiplexing the encoded picture information with the additional information, the video signal multiplexing apparatus comprising:

a separator which receives the video signal to separate the picture information and the additional information contained in the video signal;

an encoder which encodes the separated picture information;

a controller adjusting, when the picture information is out of sync with the additional information, an amount of data of the additional information stored in the additional information storage based on an amount of data of the picture information in such a manner that the picture information is in sync with the additional information; and a multiplexer which multiplexes the encoded data generated with the encoder and the adjusted additional information, wherein the controller deletes a predetermined amount of frames from the additional information when a number of frames of the additional information is greater than a number of frames of the picture information with a difference greater than a predetermined value, and the controller deletes only null data in the additional information when the number of frames of the additional information is greater than the number of frames of the picture information with a difference not greater than the predetermined value.

2. The video signal multiplexing apparatus according to claim 1, wherein the controller adds null data to the additional information when the amount of data of the additional information is less than the amount of data of the picture information by a predetermined value or less.

3. The video signal multiplexing apparatus according to claim 2, wherein the controller deletes null data first when the difference is greater than the predetermined value.

4. The video signal multiplexing apparatus according to claim 1, wherein the encoder encodes the picture information every predetermined number of frames, and the controller determines the amount of data of the picture information based on the number of frames.

5. The video signal multiplexing apparatus according to claim 1, wherein the controller adds null data to the additional information when the number of frames of the additional information is less than the number of frames of the picture information by a predetermined value or less.

6. The video signal multiplexing apparatus according to claim 1, wherein the controller deletes a predetermined amount of data from the additional information when the number of frames of the additional information is greater than the number of frames of the picture information with a difference greater than a predetermined value, and the controller deletes only null data in the additional information when the number of frames of the additional information is greater than the number of frames of the picture information with a difference not greater than the predetermined value.

7. The video signal multiplexing apparatus according to claim 6, wherein the controller deletes null data first when the difference is larger than the predetermined value.

8. The video signal multiplexing apparatus of claim 1, wherein the controller synchronizes picture information and the additional information in the video signal when a frame of the information is skipped or repeated by adjusting the amount of data of the additional information stored.

9. A video signal multiplexing apparatus for receiving a video signal containing picture information and additional information, encoding the picture information in the video signal and then multiplexing the encoded picture information with the additional information, video signal multiplexing apparatus comprising:
 a separator which receives the video signal to separate the picture information and the additional information from the video signal;
 a time based corrector which receives the separated picture information to correct a time axis of the picture information;
 an encoder which encodes the picture information the time axis of which has been corrected with the time based corrector;
 an encoded data storage which stores encoded data from the encoder;
 an additional information storage which stores the separated additional information;
 a multiplexer multiplexing the encoded data stored in the encoded data storage and the additional information stored in the additional information storage; and
 a controller adjusting, when the picture information is out of sync with the additional information, an amount of data of the additional information stored in the additional information storage based on an amount of the picture information in such a manner that the picture information is in sync with the additional information, wherein the controller deletes a predetermined amount of frames from the additional information when the number of frames of the additional information is greater than the number of frames of the picture information with a difference greater than a predetermined value, and the controller deletes only null data in the additional information when the number of frames of the additional information is greater than the number of frames of the picture information with a difference not greater than the predetermined value.

10. The video signal multiplexing apparatus of claim 9, wherein the controller synchronizes picture information and the additional information in the video signal when a frame of the information is skipped or repeated by adjusting the amount of data of the additional information stored.

11. A picture reproducer comprising the video signal multiplexer according to claim 1.

12. A video signal multiplexing method for receiving a video signal containing picture information and additional information, encoding the picture information in the video signal and then multiplexing the encoded picture information with the additional information, the method comprising:
 receiving the video signal;
 separating the picture information and the additional information from the video signal;
 encoding the separated picture information;
 adjusting, when the picture information is out of sync with the additional information, an amount of data of the additional information based on an amount of data of the picture information in such a manner that the picture information is in sync with the additional information, wherein the adjusting includes deleting a predetermined amount of data from the additional information when the amount of data of the additional information is greater than the amount of data of the picture information with a difference greater than a predetermined value, and deleting only null data in the additional information when the amount of data of the additional information is greater than the amount of data of the picture information with a difference not greater than the predetermined value; and
 multiplexing the encoded data generated through the encoding and the additional information the amount of data of which is adjusted.

13. The video signal multiplexing method according to claim 12, wherein the amount of data comprises a number of frames.

14. The video signal multiplexing method according to claim 12, wherein the controlling includes deleting null data first when the difference is greater than the predetermined value.

15. The method of claim 12, wherein synchronizing picture information and the additional information in the video signal when a frame of the information is skipped or repeated by the adjusting.

16. A video signal multiplexing method for receiving a video signal containing picture information and additional information, encoding the picture information in the video signal and then multiplexing the encoded picture information with the additional information, the method comprising:
 receiving the video signal to separate the picture information and the additional information from the video signal;
 receiving the separated picture information;
 correcting a time axis of the picture information;
 encoding the picture information the time axis of which has been corrected;
 adjusting, when the picture information is out of sync with the additional information, the number of frames of the additional information based on the number of frames of the picture information in such a manner that the picture information is in sync with the additional information,
wherein the adjusting includes deleting a predetermined amount of frames from the additional information when the number of frames of the additional information is greater than the amount of data of the picture information with a difference greater than a predetermined value, and includes deleting only null data in the additional information when the number of frames of the additional information is greater than the number of frames of the picture information with a difference not greater than the predetermined value; and multiplexing the generated encoded data and the separated additional information.

17. The video signal multiplexing method according to claim 16, further comprising adjusting, when the picture information is out of sync with the additional information, an amount of data of the additional information based on an amount of data of the picture information in such a manner that the picture information is in sync with the additional information.

* * * * *